US010598356B2

United States Patent
Kitano et al.

(10) Patent No.: US 10,598,356 B2
(45) Date of Patent: Mar. 24, 2020

(54) INSTRUMENT CONTROL DEVICE, VARIABLE DEVICE, LIGHTING CONTROL DEVICE, AND VARIABLE LIGHTING DEVICE

(71) Applicant: MINEBEA MITSUMI INC., Kitasaku-gun, Nagano (JP)

(72) Inventors: Takamichi Kitano, Kakegawa (JP); Hiroyuki Kato, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 368 days.

(21) Appl. No.: 15/414,126

(22) Filed: Jan. 24, 2017

(65) Prior Publication Data
US 2017/0130945 A1 May 11, 2017

Related U.S. Application Data

(63) Continuation of application No. PCT/JP2015/071571, filed on Jul. 23, 2015.

(30) Foreign Application Priority Data

Aug. 7, 2014 (JP) .................................. 2014-161520

(51) Int. Cl.
*G05B 19/29* (2006.01)
*F21V 21/15* (2006.01)
(Continued)

(52) U.S. Cl.
CPC .............. *F21V 21/15* (2013.01); *F21V 21/28* (2013.01); *G08C 17/00* (2013.01); *H04B 1/38* (2013.01);
(Continued)

(58) Field of Classification Search
CPC ........... F21V 21/15; F21V 21/28; H04B 1/38; H05B 37/029
(Continued)

(56) References Cited

U.S. PATENT DOCUMENTS 4,988,992 A * 1/1991 Heitschel ........... G07C 9/00309
340/12.23
5,187,420 A * 2/1993 Kajitani ................ H02P 7/2855
318/799
(Continued)

FOREIGN PATENT DOCUMENTS

CN 2114749 U 9/1992
CN 1883995 A 12/2006
(Continued)

OTHER PUBLICATIONS

Extended European Search Report dated Jan. 8, 2018 for corresponding European Application No. 15829717.6.
(Continued)

*Primary Examiner* — Bickey Dhakal
*Assistant Examiner* — Gabriel Agared
(74) *Attorney, Agent, or Firm* — Pearne & Gordon LLP

(57) ABSTRACT

An instrument control device includes a variable mechanism including a motor configured to adjust a state of an instrument, and a variable controller configured to variably control the motor with a command signal. The variable controller includes a receiver configured to receive a communication signal output from a remote controller and output a received signal in accordance with the communication signal, and a motor controller configured to increase the command signal stepwise starting from input of the received signal until a rotational speed of the motor reaches a predetermined rotational speed.

3 Claims, 8 Drawing Sheets

(51) Int. Cl.
  *G08C 17/00* (2006.01)
  *H05B 37/02* (2006.01)
  *F21V 21/28* (2006.01)
  *H04B 1/38* (2015.01)

(52) U.S. Cl.
  CPC ....... *H05B 37/029* (2013.01); *H05B 37/0254* (2013.01)

(58) Field of Classification Search
  USPC .......................................................... 318/603
  See application file for complete search history.

(56) References Cited

U.S. PATENT DOCUMENTS

| | | | | |
|---|---|---|---|---|
| 5,729,102 | A * | 3/1998 | Gotou | G11B 19/2009 318/400.13 |
| 5,828,316 | A * | 10/1998 | DiCroce | B60R 25/24 340/12.22 |
| RE39,210 | E * | 8/2006 | Horst | B61L 3/126 246/187 A |
| 8,030,871 | B1 * | 10/2011 | Young | A63H 19/24 246/187 R |
| 2002/0159262 | A1 * | 10/2002 | Romano | F21S 10/02 362/345 |
| 2004/0223271 | A1 * | 11/2004 | Ivankovic | H02P 29/02 361/23 |
| 2005/0034340 | A1 * | 2/2005 | Burke | G09F 21/04 40/591 |
| 2006/0267538 | A1 * | 11/2006 | Takeda | H02P 8/38 318/685 |
| 2006/0291136 | A1 | 12/2006 | Okishima | |
| 2013/0242176 | A1 * | 9/2013 | Yamada | H04N 5/238 348/363 |
| 2014/0030952 | A1 * | 1/2014 | Clark, Jr. | A63H 17/26 446/178 |

FOREIGN PATENT DOCUMENTS

| | | |
|---|---|---|
| CN | 203671462 U | 6/2014 |
| JP | 02-168884 A | 6/1990 |
| JP | 03-139618 A | 6/1991 |
| JP | H06-76607 A | 3/1994 |
| JP | H06-203966 A | 7/1994 |
| JP | H06-70113 U | 9/1994 |
| JP | H08-219803 A | 8/1996 |
| JP | 08-290610 A | 11/1996 |
| JP | 2000-093478 A | 4/2000 |
| JP | 2007-022303 A | 2/2007 |

OTHER PUBLICATIONS

Chinese Office Action dated Oct. 9, 2017 for corresponding Chinese Application No. 201580036340.2 and English translation.
Oct. 27, 2015 Search Report issued in International Patent Application No. PCT/JP2015/071571.
Oct. 27, 2015 Written Opinion issued in International Patent Application No. PCT/JP2015/071571.
Notification of Reasons for Refusal for corresponding Japanese Application No. 2014-161520 dated Aug. 15, 2017 and English translation.
Chinese Office Action dated Jul. 27, 2018 for corresponding Chinese Application No. 201580036340.2 and English translation.

* cited by examiner

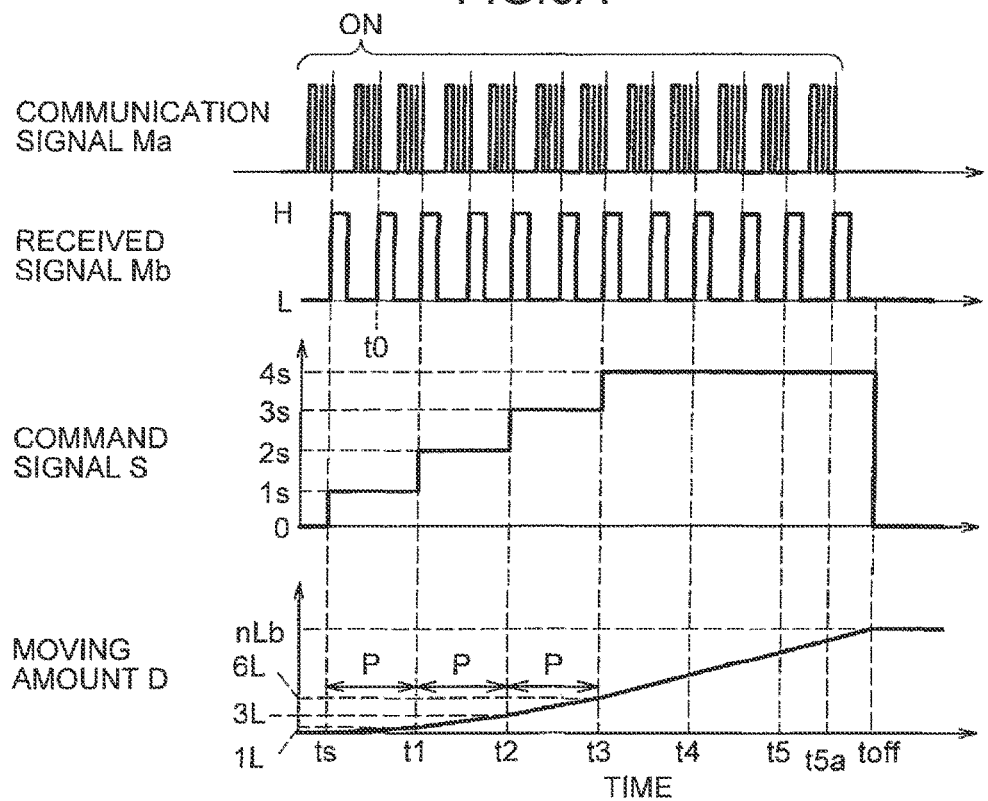
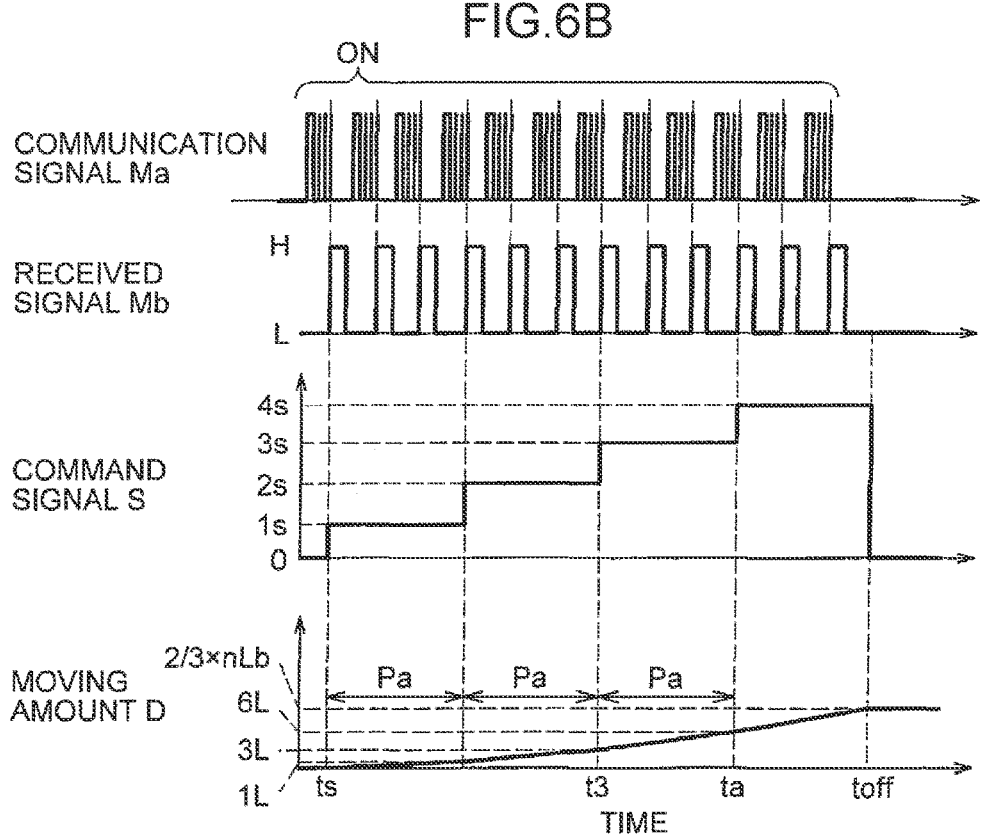

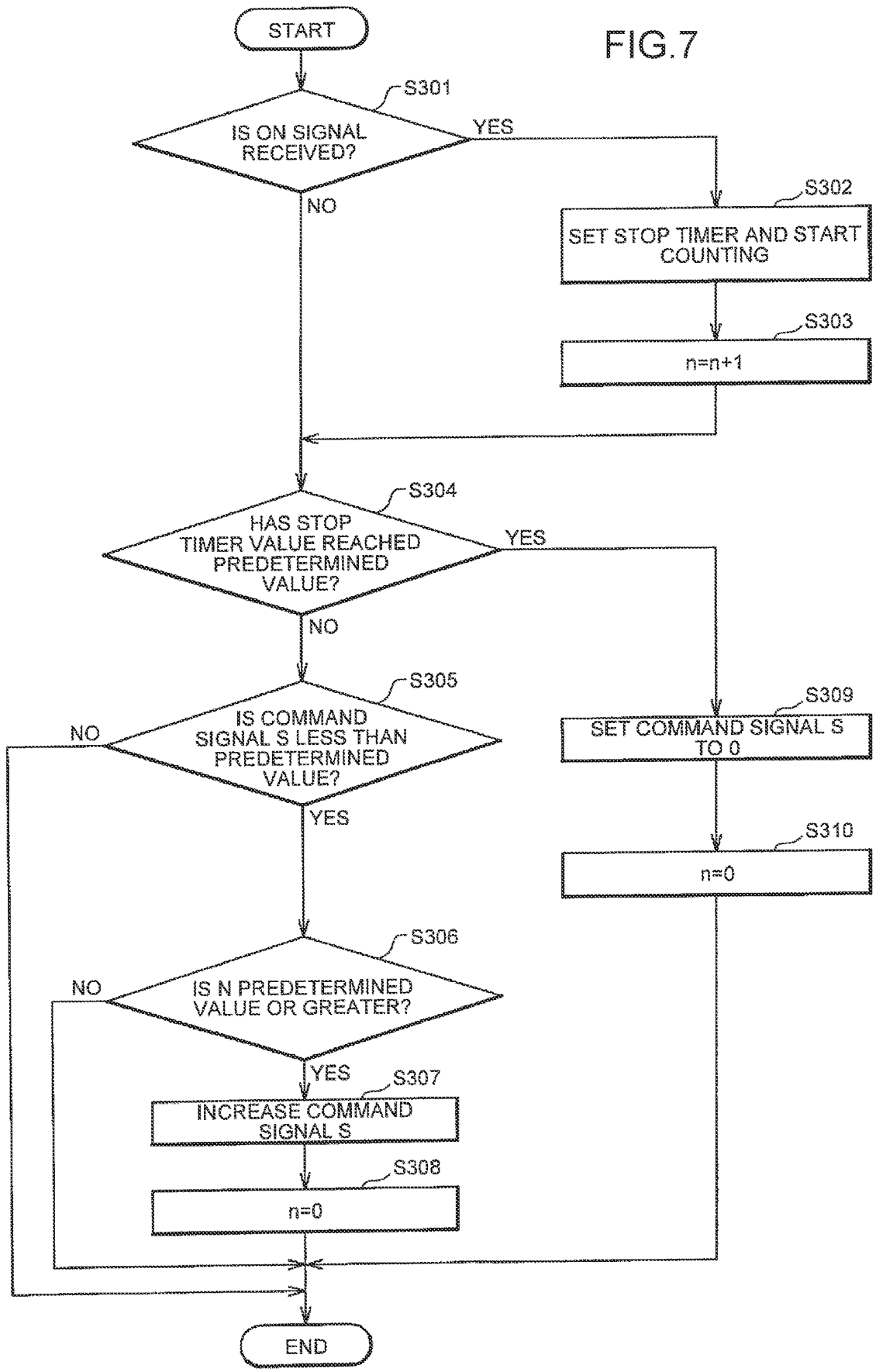

INSTRUMENT CONTROL DEVICE, VARIABLE DEVICE, LIGHTING CONTROL DEVICE, AND VARIABLE LIGHTING DEVICE

CROSS REFERENCE TO RELATED APPLICATIONS

The present application is a continuation application of International Application No. PCT/JP2015/071571, filed on Jul. 23, 2015, which claims priority to Japanese Patent Application No. 2014-161520, filed on Aug. 7, 2014. The contents of these applications are incorporated herein by reference in their entirety.

BACKGROUND

Technical Field

The present disclosure relates to an instrument control device that variably controls an angle, a position, etc. of an instrument from a remote place, for example, with a remote control, and to a variable device, and also relates to a variable lighting device called, for example, a remote control spotlight, and to a lighting control device for controlling the variable lighting device.

Background Art

In recent years, variable lighting devices serving as, for example, spotlights each operable with a remote control have come into use for aesthetic lighting in art museums, shops, stages, and the like. For example, monitoring cameras and broadcast cameras include those operable to pan, tilt, and zoom by a remote control. Projection devices, such as liquid crystal projectors, also include those operable to change the states such as a focus on a screen and a projection angle by a remote control. By being configuring to be operable by a remote controller, such as the remote control, lighting instruments, photographing instruments, and projection devices can be set from a remote place without the need for work at height.

Variable lighting devices disclosed in Japanese Unexamined Patent Application Publication No. 6-76607 are described as "being capable of providing effective aesthetic lighting by setting in advance, for example, the luminance and directions of projection of the respective variable lighting devices as those for scenes in accordance with progression or the like of the stage, and reproducing the settings for each scene in accordance with actual progression of the stage" (in paragraph 0002).

Each of the variable lighting devices disclosed in Japanese Unexamined Patent Application Publication No. 6-76607 is characterized by "being finely adjusted by driving a variable mechanism at a second speed lower than a first speed from a stop position to a target position, and thereby being capable of stopping exactly in the target position" (in paragraph 0012). The variable lighting device disclosed in Japanese Unexamined Patent Application Publication No. 6-76607 can be stopped by such automatic control in the target position stored in advance.

The aesthetic lighting requires, in addition to such automatic control, manual control in which an operator operates a direction adjustment push button of the remote control to manually set the lighting direction or the focal length of the variable lighting device. In the same way, the photographing instruments, such as the monitoring cameras and the broadcast cameras, need also to be manually set to pan, tilt, and zoom in some cases. The projection devices also need, in the same way, to be manually set to change the states such as a focus on a screen and a projection angle, in some cases.

Japanese Unexamined Patent Application Publication No. 6-76607 is silent on a method of finely adjusting a position illuminated by the variable lighting device with a direction adjustment push button when the position illuminated by the variable lighting device is manually set. Japanese Unexamined Patent Application Publication No. 6-76607 suggests in paragraph 0017 the manual fine adjustment such that operating a push button marked "Fine" activates a fine adjustment mode, but does not describe a specific method of the adjustment. In addition, the fine adjustment using the push button for fine adjustment may complicate the operation due to an increase in the number of keys to be operated. In the manual control, however, the variable mechanism has been difficult to be finely adjusted as desired by the operator without the push button for fine adjustment.

The present disclosure is related to providing a variable device or a variable lighting device that allows fine adjustment of a variable mechanism desired by an operator in manual control without adding a push button to a remote controller, such as a remote control, and to provide an instrument control device or a lighting control device for controlling the variable device or the variable lighting device, respectively.

SUMMARY

According to an aspect of the present disclosure, an instrument control device may include: a variable mechanism including a motor configured to adjust a state of an instrument; and a variable controller configured to variably control the motor with a command signal. The variable controller may include: a receiver configured to receive a communication signal output from a remote controller and output a received signal in accordance with the communication signal; and a motor controller configured to increase the command signal stepwise starting from input of the received signal until a rotational speed of the motor reaches a predetermined rotational speed.

In the instrument control device, the receiver may be configured to output an ON signal or OFF signal of the motor as the received signal, and the motor controller may be configured to increase the command signal stepwise starting from input of the ON signal until the command signal reaches a predetermined value and thereafter maintain the command signal at the predetermined level, and to set the command signal to zero to stop the motor at a time the OFF signal is input.

In the instrument control device, the motor controller may include: an ON/OFF controller configured to determine whether the input received signal is the ON signal or the OFF signal, and stop the motor at a time the input received signal is the OFF signal; a timer configured to measure elapsed time after the ON signal is input as the received signal; and a rotational speed controller configured to increase the command signal stepwise at predetermined intervals of time starting from input of the ON signal until the command signal reaches the predetermined value.

In the instrument control device, the receiver may be configured to successively output pulses of a pulse signal as the received signal at a predetermined period, and stop outputting the pulse signal. Further, the motor controller may be configured to increase the command signal stepwise starting from input of the pulses of the pulse signal until the command signal reaches a predetermined value and thereafter maintain the command signal at the predetermined level, and to set the command signal to zero to stop the motor at a time the input of the pulse signal is stopped.

In the instrument control device, the motor controller may be configured to increase the command signal stepwise at a frequency obtained by dividing a frequency of the pulse signal by a natural number N starting from input of the pulses of the pulse signal until the command signal reaches a predetermined value.

In the instrument control device, the motor controller may comprise: an ON controller configured to determine whether the pulse signal is input; a stop timer configured to measure elapsed time starting from input of the pulse signal every time each pulse of the pulse signal is input, and stop the motor at a time the elapsed time exceeds a predetermined time period set in advance; a counter configured to count an input count of the pulses of the pulse signal, and set the input count to zero at a time the input count reaches a predetermined number of times; and a rotational speed controller configured to increase the command signal stepwise every time the input count counted by the counter reaches the predetermined number of times starting from the input of the pulse signal until the command signal reaches the predetermined value.

In the instrument control device, the instrument may be a lighting instrument, and the variable mechanism may include at least one motor configured to adjust a lighting direction or a focal length of the lighting instrument.

According to an aspect of the present disclosure, a variable device may include: any one of the above instrument control devices; an instrument configured to change a state by being driven by the instrument control device; and a remote controller configured to send, to the instrument control device, a communication signal driving the motor to change the state of the instrument.

According to an aspect of the present disclosure, a lighting control device may include: a variable mechanism including at least one motor configured to adjust a lighting direction or a focal length of a lighting instrument; and a variable controller configured to variably control the motor with a command signal. The variable controller may include: a receiver configured to receive a communication signal output from a remote controller, and output a received signal in accordance with the communication signal; and a motor controller configured to increase the command signal stepwise starting from input of the received signal until a rotational speed of the motor reaches a predetermined rotational speed.

According to an aspect of the present disclosure, a variable lighting device may include: the above lighting control device; a lighting instrument configured to be rotationally driven in at least one axial direction by the lighting control device; and a remote controller configured to send, to the lighting control device, a communication signal that rotates the lighting instrument.

According to the present disclosure, in a variable device and an instrument control device for controlling the variable device, or in a variable lighting device and a lighting control device for controlling the variable lighting device, a variable mechanism can be finely adjusted as desired by an operator in a manual control without an addition of a push button to a remote controller.

BRIEF DESCRIPTION OF DRAWINGS

FIGS. 6A and 6B are timing diagrams each illustrating the variable control operation in the second embodiment.

FIG. 7 is a flowchart illustrating a variable control process in the second embodiment.

DETAILED DESCRIPTION

The following describes embodiments for carrying out the present disclosure in detail with reference to the drawings.

Configuration of First Embodiment

Figure 1:
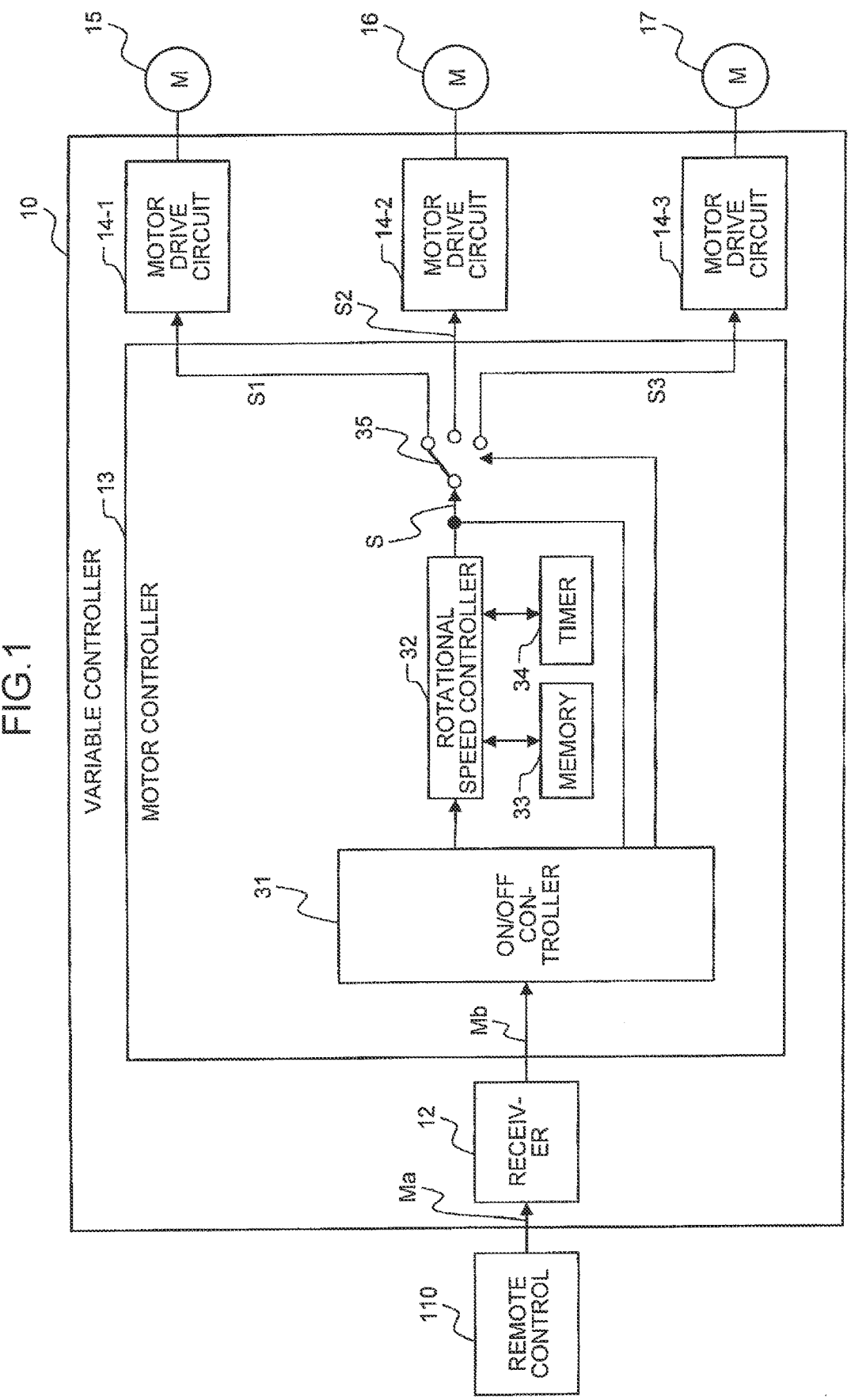
FIG. 1 is a block diagram illustrating an outline of a variable controller in a first embodiment of the present disclosure.

FIG. 1 is a block diagram illustrating the outline of a variable controller 10 in a first embodiment of the present disclosure.

As illustrated in FIG. 1, the variable controller 10 of the first embodiment includes a receiver 12 that receives a communication signal Ma output from a remote control 110 (an example of a remote controller), a motor controller 13 that controls a motor, and motor drive circuits 14-1 to 14-3. The variable controller 10 variably controls each rotational speed of a pan motor 15, a tilt motor 16, and a focus motor 17. The pan motor 15, the tilt motor 16, and the focus motor 17 will hereinafter be called simply motors 15 to 17 when not distinguished from each other.

The receiver 12 receives the communication signal Ma output from the remote control 110, decodes the communication signal Ma, and outputs a received signal Mb. The receiver 12 extracts an ON signal or an OFF signal, direction information (pan, tilt, and focus), and the direction of rotation of the motor from the communication signal Ma, and then outputs these signals to the motor controller 13. Each of these signals is represented by one pulse shape in a simplified way in each timing diagram given below.

Based on the received signal Mb, the motor controller 13 generates command signals S1 to S3 each controlling the rotational speed of one of the motors 15 to 17. Each of the command signals S1 to S3 will hereinafter be called simply a command signal S when not distinguished from each other. The command signal S output by the motor controller 13 to one of the motor drive circuits 14 includes a command for the direction of rotation of the motor. For example, turning the command signal S negative reverses the direction of rotation of the motor. In this specification, for example, a level of the command signal S represents a voltage of the command signal S.

The first and the second embodiments will ignore whether the type of the motion is pan, tilt, or focus and which is the direction of rotation of the motor. The processing will be described in the case where one type of the motions and one of the directions of rotation of the motor are selected. When a drive command in the reverse direction is received, the motor is controlled in the same way as in the case of the drive command in the normal direction, except that the polarity of the command S is reversed.

The motor drive circuit 14-1 drives the pan motor 15 at a rotational speed corresponding to the command signal S1. The pan motor 15 adjusts the lighting direction of a lighting instrument rightward and leftward.

The motor drive circuit 14-2 drives the tilt motor 16 at a rotational speed corresponding to the command signal S2. The tilt motor 16 adjusts the lighting direction of the lighting instrument upward and downward.

The motor drive circuit 14-3 drives the focus motor 17 at a rotational speed corresponding to the command signal S3. The focus motor 17 adjusts the focal length of the lighting instrument in the front-back direction.

The present embodiment is described by way of an example of adjusting (controlling) the states of, for example, pan, tilt, and zoom of the lighting instrument. The embodiment may, however, adjust (control) any one of the states of pan, tilt, and zoom. The embodiment may adjust (control) the states of, for example, pan, tilt, and zoom of a monitoring camera or a broadcast instrument, such as a broadcast camera, as an instrument to be controlled. Moreover, the embodiment may use the motors to adjust (control) the states of, for example, focusing on a screen and a projection angle of a projection device typified by, for example, a liquid crystal projector or a DLP projector (registered trademark), as an instrument to be controlled.

Configuration of Motor Controller 13

The motor controller 13 of the first embodiment includes an ON/OFF controller 31, a rotational speed controller 32, a memory 33, a timer 34, and a selection switch 35. The motor controller 13 increases the command signal S stepwise starting from input of the ON signal until the command signal S reaches a predetermined value, and thereafter, does not change the command signal S (i.e., the motor controller 13 maintains the command signal S at the predetermined level after the value of the command signal S reaches the predetermined level). For example, the motor controller 13 increases a voltage of the command signal S stepwise starting from input of the ON signal until the command signal S reaches a predetermined voltage, and thereafter maintains the voltage of the command signal S at the predetermined voltage. When the OFF signal is input, the motor controller 13 sets the command signal S to zero to stop the motor.

The ON/OFF controller 31 is alternately supplied, as the received signal Mb, with the ON signal for starting the rotation of the motor and the OFF signal for stopping the rotation of the motor. The ON/OFF controller 31 determines whether the received signal Mb input thereto is the ON signal or the OFF signal, and stops the motor when the received signal Mb is the OFF signal.

The rotational speed controller 32 increases the command signal S stepwise by a predetermined amount at predetermined intervals of time starting from input of the ON signal until the command signal S reaches the predetermined value.

The memory 33 stores, for example, the predetermined value serving as a maximum value up to which the command signal S is increased and the predetermined amount.

The timer 34 measures elapsed time since the ON signal included in the received signal Mb is received.

The selection switch 35 selects the motor to which the command signal S is output. The variable controller 10 is assumed to control an operation in the directions one by one. For example, in the case of causing the panning and tilting operations of 90 degrees each, the variable controller 10 causes first the panning operation of 90 degrees, and then the tilting operation of 90 degrees. By performing the control in this way, the variable controller 10 can control the operations with a configuration having the power supply of a low capacity and being incapable of driving two motors at the same time. The motor controller 13 is implemented, for example, by a microcomputer, which has a predetermined limit in the number of timer resources. Providing the selection switch 35 allows the single microcomputer to control the motors at low cost.

The embodiment is not limited to this configuration, but a plurality of such motor controllers 13 may be implemented by providing microcomputers that drive the respective motors. This configuration allows the motors 15 to 17 to be driven in parallel to attain desired goals of the lighting direction and the focal length in a short time.

Figure 2:
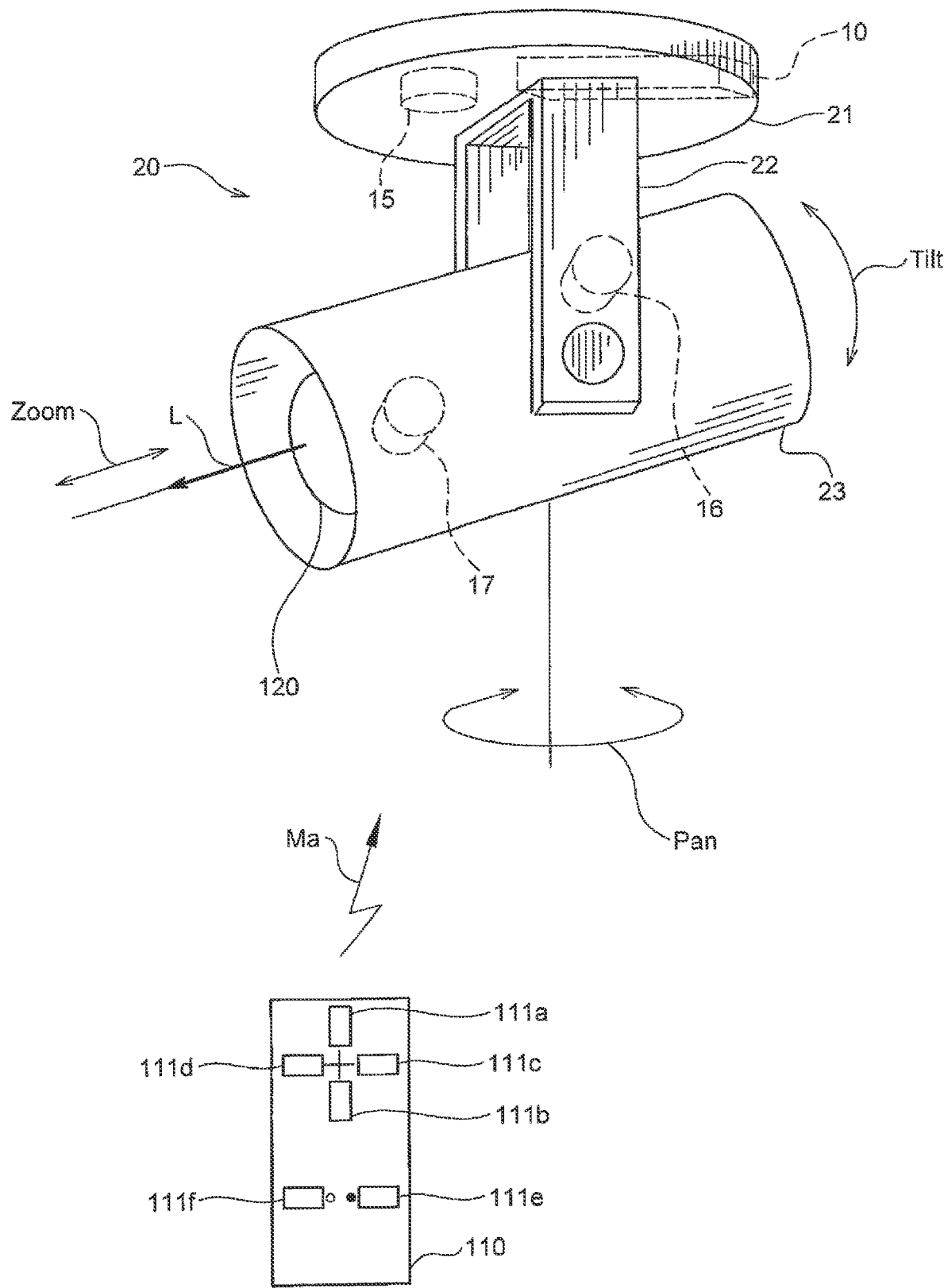
FIG. 2 is an oblique perspective view of a variable lighting device in the first embodiment.

FIG. 2 is an oblique perspective view of a variable lighting device 20 in the first embodiment.

As illustrated in FIG. 2, the variable lighting device 20 includes a right/left rotating part 21, an arm 22 fixed to the bottom of the right/left rotating part 21, and a hood 23 held by the arm 22.

The right/left rotating part 21 includes the pan motor 15 and the variable controller 10. The right/left rotating part 21 is connected to a fixing part of a ceiling, and is configured to be rotatable to the right and left by the pan motor 15. The right/left rotating part 21 holds the arm 22, and can pan the lighting direction of a lighting instrument 120 to the right and left with the rotation of the pan motor 15.

The hood 23 is held by the arm 22, and is configured to be rotatable upward and downward by the tilt motor 16 mounted on the arm 22. The rotation of the tilt motor 16 can tilt the lighting direction of the lighting instrument 120 upward and downward.

The hood 23 houses therein the lighting instrument 120, and is configured to be capable of adjusting the focal length of the lighting instrument 120 with the focus motor 17 and a lens (not illustrated).

The remote control 110 sends the communication signal Ma for rotating the lighting instrument 120 to the variable controller 10 (a lighting control device, or an instrument control device) through a Wi-Fi (registered trademark) network.

Pressing a direction adjustment push button 111a rotates the tilt motor 16 in the normal direction, and thus can swing the variable lighting device 20 upward. Pressing a direction adjustment push button 111b rotates the tilt motor 16 in the reverse direction, and thus can swing the variable lighting device 20 downward. These operations tilt the lighting direction.

In the same way, pressing a direction adjustment push button 111c rotates the pan motor 15 in the normal direction, and thus can swing the variable lighting device 20 rightward. Pressing a direction adjustment push button 111d rotates the pan motor 15 in the reverse direction, and thus can swing the variable lighting device 20 leftward. These operations pan the lighting direction.

Pressing a direction adjustment push button 111e rotates the focus motor 17 in the normal direction, and thus can change the focal length of the variable lighting device 20 in the direction of far-lighting. Pressing a direction adjustment push button 111f rotates the focus motor 17 in the reverse direction, and thus can change the focal length of the variable lighting device 20 in the direction of near-lighting. These operations can change the focal length of (zoom) the variable lighting device 20.

That is, pressing any one of the direction adjustment push buttons 111a to 111f of the remote control 110 rotates the motor corresponding to the pressed push button, and thus can pan or tilt the lighting direction of the variable lighting device 20, or change the focal length (zoom) of the variable lighting device 20. Each of the direction adjustment push buttons 111a to 111f will hereinafter be called simply a direction adjustment push button 111 when not distinguished from each other.

Communication methods applicable to the present disclosure are broadly classified into two types. One is a first communication method in which the communication signal Ma includes the ON signal and the OFF signal, and the other is a second communication method in which the communication signal Ma includes only the ON signal (pulse signal) but no OFF signal.

The first communication method is a method of communication between the variable lighting device 20 and the remote control 110 of the first embodiment. The first communication method is carried out, for example, as a radio frequency (RF) communication method typified by, for example, ZigBee (registered trademark), Wi-Fi (registered trademark), and BlueTooth (registered trademark) communication methods.

The second communication method is a method of communication between the variable lighting device 20 and a remote control 110A (refer to FIG. 5) of the second embodiment. The second communication method is carried out, for example, as an infrared (IR) communication method.

The receiver 12 of each of the embodiments extracts the ON signal or the OFF signal from the corresponding communication signal Ma. The communication methods are merely specific examples, and not limited thereto. Whether the communication methods are wired or wireless does not matter.

In the first embodiment, the remote control 110 outputs the ON signal when the direction adjustment push button 111 is pressed, and outputs the OFF signal when the direction adjustment push button 111 is released. The embodiment is, however, not limited to this configuration. The remote control 110 may output the ON signal when the direction adjustment push button 111 is pressed and released, and output the OFF signal when the same operation is repeated.

Operation of Comparative Example

A comparative example can be considered in which fine adjustment is enabled by switching the speed of driving a variable mechanism of the lighting from a first speed to a second speed. The comparative example will be briefly described. In the same way as in the first embodiment illustrated in FIG. 1, the variable controller 10 of the comparative example includes the receiver 12 that receives the communication signal Ma of the remote control 110, the motor controller 13 that controls the motors 15 to 17, and the motor drive circuits 14-1 to 14-3.

Figure 8A:
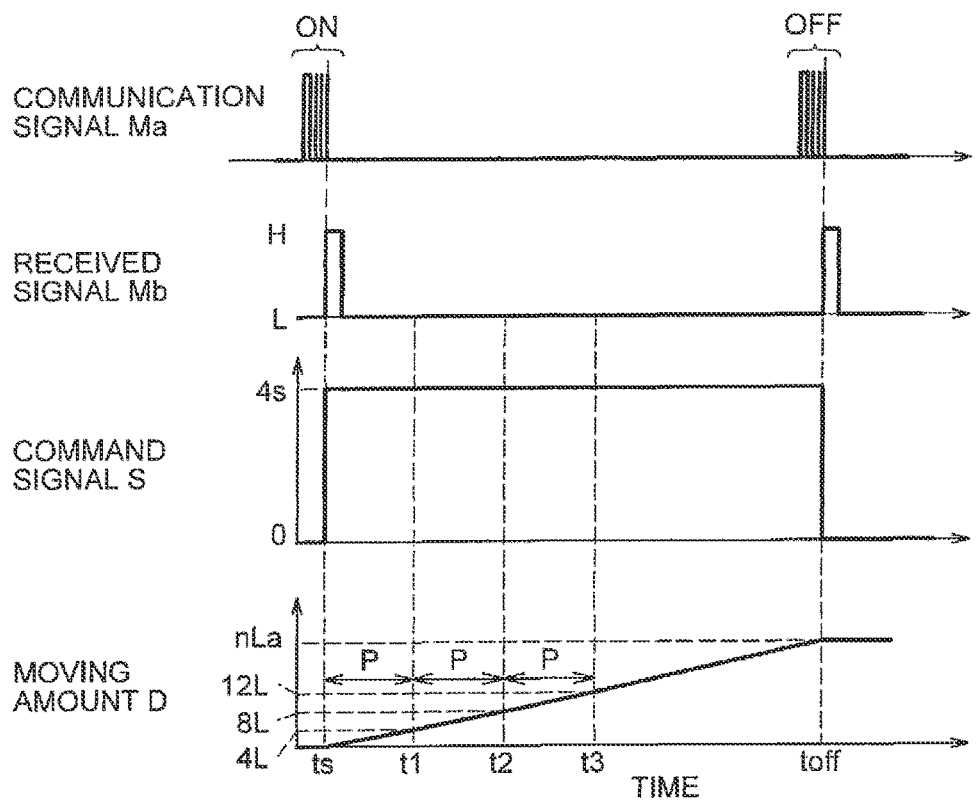
FIGS. 8A and 8B are timing diagrams each illustrating a control operation of a comparative example.
Figure 8B:
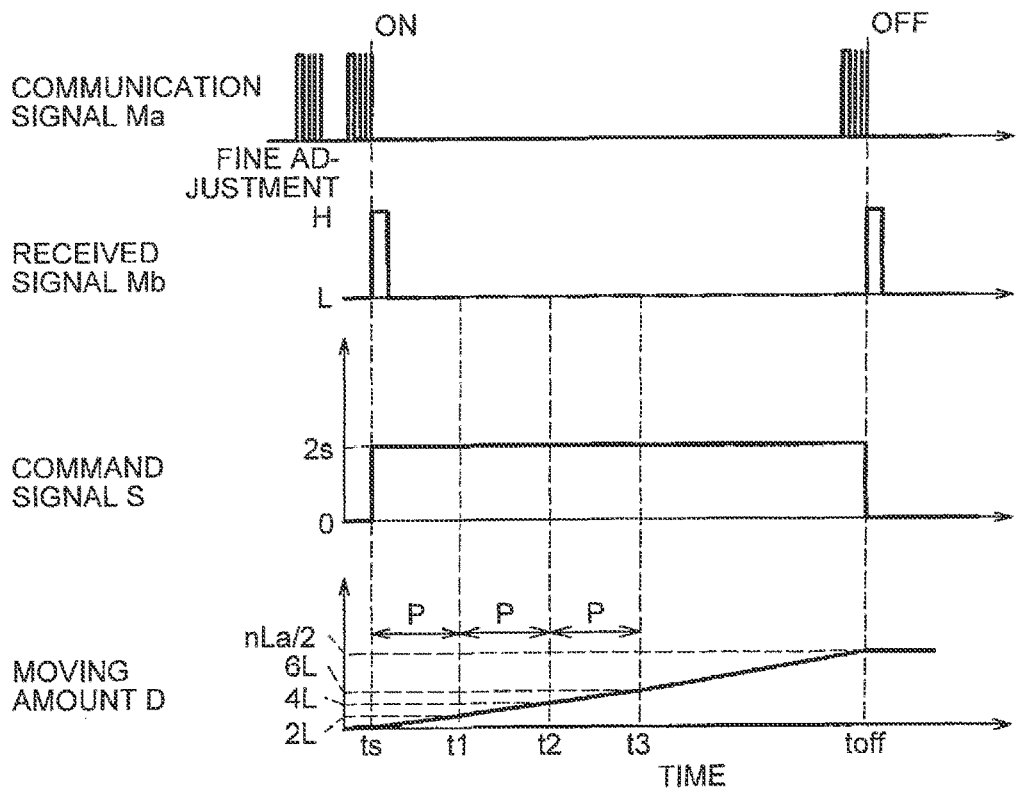

FIGS. 8A and 8B are timing diagrams each illustrating a control operation of the comparative example.

FIG. 8A is a timing diagram illustrating a case in which a stop position is moved at the first speed by the direction adjustment push button 111. The vertical axes of the rows of the timing diagram represent the communication signal Ma, the received signal Mb, the command signal S, and a moving amount D of the motor. The horizontal axes represent time common to the rows.

Immediately before time ts, an operator presses the direction adjustment push button 111 of the remote control 110. This operation causes the communication signal Ma including the ON signal to be sent from the remote control 110, and the sending ends at time ts.

At time ts, the ON signal given by the received signal Mb is input to the motor controller 13 (drive controller). This ON signal serves as a command to start operating the variable mechanism. The motor controller 13 sets the command signal S indicating the rotational speed of the motor to a level of 4s, and outputs the command signal S to the motor drive circuit 14. This operation rotates the motor at the first speed. The level of the command signal S is constant, so that the moving amount D of the motor linearly increases corresponding to the elapsed time from when the ON signal is received. At this time, the moving amount D increases at 4 L per predetermined time period P.

Immediately before time toff, the operator judges that the lighting instrument 120 has moved to a desired position, and releases the direction adjustment push button 111 of the remote control 110. This operation causes the communication signal Ma including the OFF signal to be sent from the remote control 110, and the sending ends at time toff.

At time toff, the OFF signal given by the received signal Mb is input to the motor controller 13. This OFF signal serves as a command to stop operating the variable mechanism. The motor controller 13 outputs the command signal S at a level of zero to the motor drive circuit 14 to stop the motor. The moving amount D of the motor reaches nLa.

FIG. 8B is a timing diagram illustrating a case in which the stop position is moved at the second speed by a fine adjustment push button. The vertical axes of the rows of the timing diagram represent the communication signal Ma, the received signal Mb, the command signal S, and the moving amount D of the motor. The horizontal axes represent time common to the rows.

Before time ts, the operator presses the fine adjustment push button (not illustrated) of the remote control 110. This operation causes the communication signal Ma including a fine adjustment signal to be sent from the remote control 110. This fine adjustment signal shifts the motor controller 13 into a fine adjustment mode.

Immediately before time ts, the operator presses the direction adjustment push button 111 of the remote control 110. This operation causes the communication signal Ma including the ON signal to be sent from the remote control 110, and the sending ends at time ts.

At time ts, the ON signal given by the received signal Mb is input to the motor controller 13 (drive controller). This ON signal serves as a command to start operating the variable mechanism. The motor controller 13 sets the command signal S indicating the rotational speed of the motor to a level of 2s, and outputs the command signal S to the motor drive circuit 14. This operation rotates the motor at the second speed. The level of the command signal S is constant, so that the moving amount D of the motor linearly increases corresponding to the elapsed time from when the ON signal is received. At this time, the moving amount D increases at 2 L per predetermined time period P.

Immediately before time toff, the operator judges that the lighting instrument 120 has moved to a desired position, and releases the direction adjustment push button 111 of the remote control 110. This operation causes the communication signal Ma including the OFF signal to be sent from the remote control 110, and the sending ends at time toff.

At time toff, the OFF signal given by the received signal Mb is input to the motor controller 13. This OFF signal serves as a command to stop operating the variable mechanism. The motor controller 13 outputs the command signal S at a level of zero to the motor drive circuit 14 to stop the motor.

As illustrated in FIG. 8B, the command signal S stays at the level of 2s while the fine adjustment push button is pressed. As a result, the moving amount D results in a half that obtained when the fine adjustment push button is not pressed, even though the direction adjustment push button 111 is kept pressed for the same period. This result allows the operator to accurately adjust the stop position in the fine adjustment mode. This solution, however, requires an addition of the fine adjustment push button to the remote control 110 to prepare two types of push buttons. In addition, the fine adjustment using the fine adjustment push button may complicate the operation due to an increase in the number of keys to be operated.

Operation of First Embodiment

Figure 3:
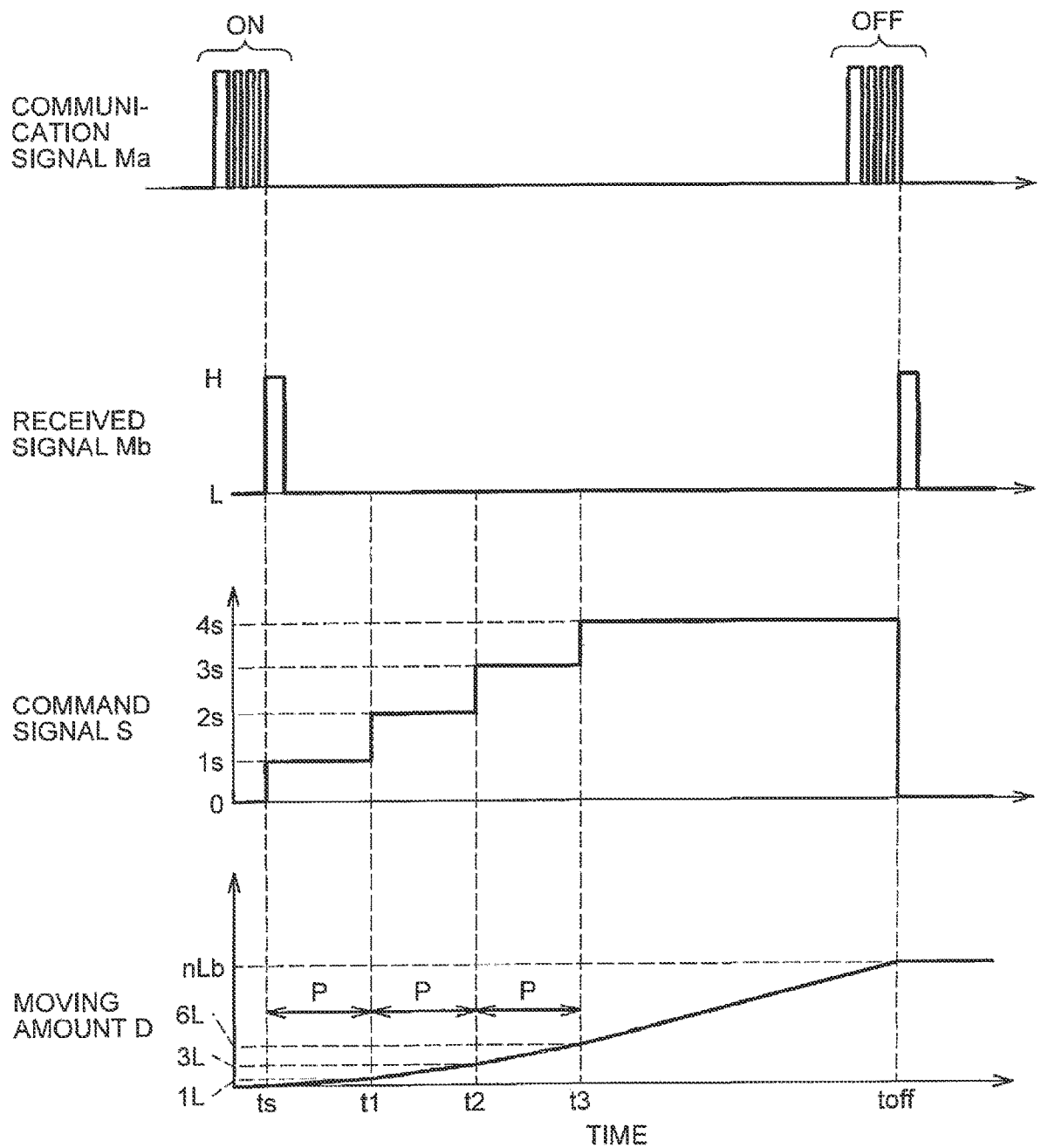
FIG. 3 is a timing diagram illustrating a variable control operation in the first embodiment.

FIG. 3 is a timing diagram illustrating the variable control operation in the first embodiment. The vertical axes of the rows of the timing diagram represent the communication signal Ma, the received signal Mb, the command signal S, and the moving amount D of the motor. The horizontal axes represent time common to the rows.

Immediately before time ts, the operator presses the direction adjustment push button 111 of the remote control 110. This operation causes the communication signal Ma including the ON signal to be sent from the remote control 110, and the sending ends at time ts.

At time ts, the ON signal given by the received signal Mb is input to the motor controller 13 (drive controller). This ON signal serves as a command to start operating the variable mechanism. The ON/OFF controller 31 of the motor controller 13 issues a drive start command to the rotational speed controller 32. The rotational speed controller 32 outputs the command signal S at a level of is corresponding to an initial rotational speed of the motor to the motor drive circuit 14, and commands the timer 34 to start measuring time. The command signal S at the level of is causes the moving amount D of the motor to linearly increase corresponding to the elapsed time from time ts. At this time, the moving amount D increases at 1 L per predetermined time period P.

The moving amount D of the motor is 1 L at time t1. The timer 34 notifies the rotational speed controller 32 that the predetermined time period P has elapsed. After receiving the notification of the elapse of the predetermined time period P from the timer 34, the rotational speed controller 32 sets the command signal S to a level of 2s, outputs the command signal S to the motor drive circuit 14, and commands the timer 34 to reset the measuring and measure the time again. The command signal S at the level of 2s causes the subsequent moving amount D of the motor to linearly increase corresponding to the elapsed time from time t1. At this time, the moving amount D increases at 2 L per predetermined time period P.

The moving amount D of the motor is 3 L at time t2. The timer 34 notifies the rotational speed controller 32 that the predetermined time period P has elapsed. After receiving the notification of the elapse of the predetermined time period P from the timer 34, the rotational speed controller 32 sets the command signal S to a level of 3s, outputs the command signal S to the motor drive circuit 14, and commands the timer 34 to reset the measuring and measure the time again. The command signal S at the level of 3s causes the subsequent moving amount D of the motor to linearly increase corresponding to the elapsed time from time t2. At this time, the moving amount D increases at 3 L per predetermined time period P.

The moving amount D of the motor is 6 L at time t3. The timer 34 notifies the rotational speed controller 32 that the predetermined time period P has elapsed. After receiving the notification of the elapse of the predetermined time period P from the timer 34, the rotational speed controller 32 sets the command signal S to a level of 4s, outputs the command signal S to the motor drive circuit 14, and maintains the level of the command signal S thereafter. The command signal S at the level of 4s causes the moving amount D of the motor to linearly increase corresponding to the elapsed time from time t3.

In this way, the rotational speed controller 32 increases the level of the command signal S stepwise by the predetermined amount of is at intervals of the predetermined time period P until the level of the command signal S reaches the predetermined value of 4s at which the rotational speed of the motor reaches a predetermined rotational speed. This operation increases the moving amount D of the motor per predetermined time period P stepwise corresponding to the command signal S.

Immediately before time toff, the operator judges that the lighting instrument 120 has moved to a desired position, and releases the direction adjustment push button 111 of the remote control 110. This operation causes the communication signal Ma including the OFF signal to be sent from the remote control 110, and the sending ends at time toff.

At time toff, the OFF signal given by the received signal Mb is input to the motor controller 13. This OFF signal serves as a command to stop operating the variable mechanism. The motor controller 13 outputs the command signal S at a level of zero to the motor drive circuit 14 to stop the motor. The moving amount D of the motor reaches nLb.

When the operator intends to finely adjust the moving amount D of the variable mechanism, the operator only needs to, for example, release the direction adjustment push button 111 of the remote control 110 immediately before time t1. This operation sets the moving amount D of the motor to 1 L. Moreover, the moving amount D of the motor can be increased to 2 L by repeating twice the ON/OFF operation on the remote control 110 in the same timing.

When the operator intends to coarsely adjust the moving amount D of the variable mechanism, the operator only needs to, for example, release the direction adjustment push button 111 of the remote control 110 immediately before time toff. This operation increases the moving amount D of the motor to nLb. The motor is driven at the predetermined rotational speed from time t3 until time toff, so that the moving amount D can be quickly increased to nLb. In this way, the increment of the moving amount D of the motor per predetermined time period P increases with the elapsed time, so that the moving amount D of the motor can be finely controlled by using the changing period of the increment from time is to time t3. From time t3 on, the motor is driven by the command signal S at the level of 4s, so that the moving amount D of the motor can be quickly increased at the predetermined rotational speed. That is, the moving amount D of the motor can be finely adjusted, and also the motor can be quickly moved to a target position, without an addition of a push button for shifting into the fine adjustment mode to the remote control 110.

Individual human ability places a limit on the fastest time from when the operator presses the direction adjustment push button 111 until the operator releases it. For example, the fastest time is said to be 50 milliseconds to 70 milliseconds. Accordingly, the predetermined time period P is preferably set to such a limit value. Such setting allows the variable mechanism to be finely adjusted corresponding to the limit value of the time interval at which the operator presses the direction adjustment push button 111. In addition, the motor controller 13 increases the command signal S stepwise at intervals of the limit value of the time interval at which the operator presses the direction adjustment push button 111, so that the motor reaches the predetermined rotational speed in the shortest time. As a result, both the fine adjustment of the variable mechanism and the quick movement of the variable mechanism to the target position can be achieved. Moreover, the stepwise increase in the command signal S substantially linearly accelerates the motor as though a predetermined acceleration were applied. This operation allows the operator to easily predict the position and the speed of the motor, and to adjust the variable mechanism into a desired state.

The predetermined time period P may be set to a value larger than the limit value. Such setting increases the changing period of the increment of the moving amount D, so that the operator can easily perform the fine adjustment operation.

Figure 4:
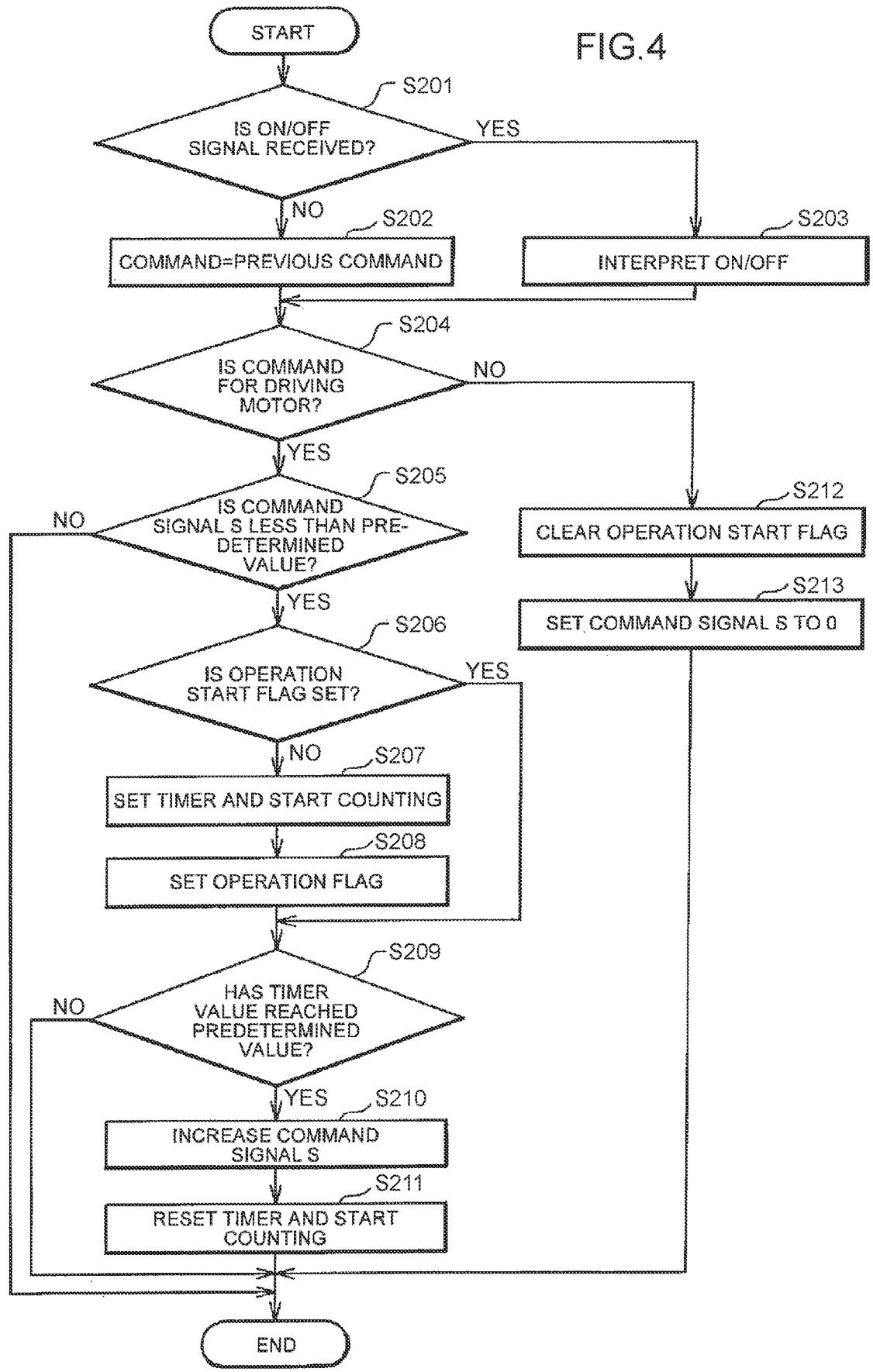
FIG. 4 is a flowchart illustrating a variable control process in the first embodiment.

FIG. 4 is a flowchart illustrating a variable control process in the first embodiment.

This variable control process is started, for example, at a predetermined period.

At Step S201, the ON/OFF controller 31 determines, according the received signal Mb, whether an ON signal or an OFF signal is received. If neither the ON signal nor the OFF signal is received (No), the ON/OFF controller 31 performs processing at Step S202, or if the ON signal or the OFF signal is received (Yes), the ON/OFF controller 31 performs processing at Step S203.

At Step S202, the ON/OFF controller 31 determines that the current command is not changed from the previous command, and performs processing at Step S204.

At Step S203, the ON/OFF controller 31 interprets the current command from the received signal Mb. That is, the ON/OFF controller 31 has determined the content of the command before entering Step S204.

At Step S204, the ON/OFF controller 31 determines whether the current command is for driving the motor. If the current command is determined to be for driving the motor (Yes), the ON/OFF controller 31 performs processing at Step S205, or if the command is determined to be for stopping, and not for driving the motor, (No), the ON/OFF controller 31 performs processing at Step S212.

At Step S205, the rotational speed controller 32 outputs the command signal S to the motor drive circuit 14, and determines whether the command signal S is less than a predetermined value. If the command signal S is determined to be less than the predetermined value (Yes), the rotational speed controller 32 performs processing at Step S206, or if the command signal S is determined to be the predetermined value or greater (No), the process of FIG. 4 ends.

At Step S206, the rotational speed controller 32 determines whether an operation start flag is set. If the operation start flag is set (Yes), the rotational speed controller 32 performs processing at Step S209, or if the operation start flag is not set (No), the rotational speed controller 32 performs processing at Step S207. The operation start flag is a flag for determining a first execution of the command for driving the motor.

At Step S207, because this is the first execution, the rotational speed controller 32 sets the value of the timer 34 to a predetermined value of a count corresponding to the predetermined time period P, and starts the timer 34 to count time.

At Step S208, the rotational speed controller 32 sets the operation start flag.

At Step S209, the rotational speed controller 32 determines whether the value of the timer 34 has reached the predetermined value. If the value of the timer 34 has reached the predetermined value (Yes), the rotational speed controller 32 performs processing at Step S210, or if the value of the timer 34 has not reached the predetermined value (No), the process of FIG. 4 ends.

At Step S210, the rotational speed controller 32 increases the level of the command signal S corresponding to the rotational speed of the motor by the predetermined amount, and outputs the result.

At Step S211, the rotational speed controller 32 resets the timer 34, and starts it again to count time, and the process of FIG. 4 ends.

At Step S212, the ON/OFF controller 31 clears the operation start flag.

At Step S213, the ON/OFF controller 31 sets the command signal S to zero. This setting stops the motor. After the processing at Step S213 ends, the process of FIG. 4 ends.

Processing in this way increases the rotational speed of the motor stepwise until the rotational speed reaches the predetermined rotational speed. The operator can finely adjust the moving amount D of the motor by pressing the direction adjustment push button 111 only for a short time. Processing in this way allows the variable controller 10 to finely adjust the variable mechanism corresponding to the limit value of the time interval at which the operator presses the direction adjustment push button 111.

Moreover, after reaching the predetermined rotational speed, the rotational speed of the motor remains at the predetermined rotational speed. The operator can quickly change the lighting direction or the focal length to a target direction or length by keeping on pressing the direction adjustment push button 111.

Second Embodiment

Figure 5:
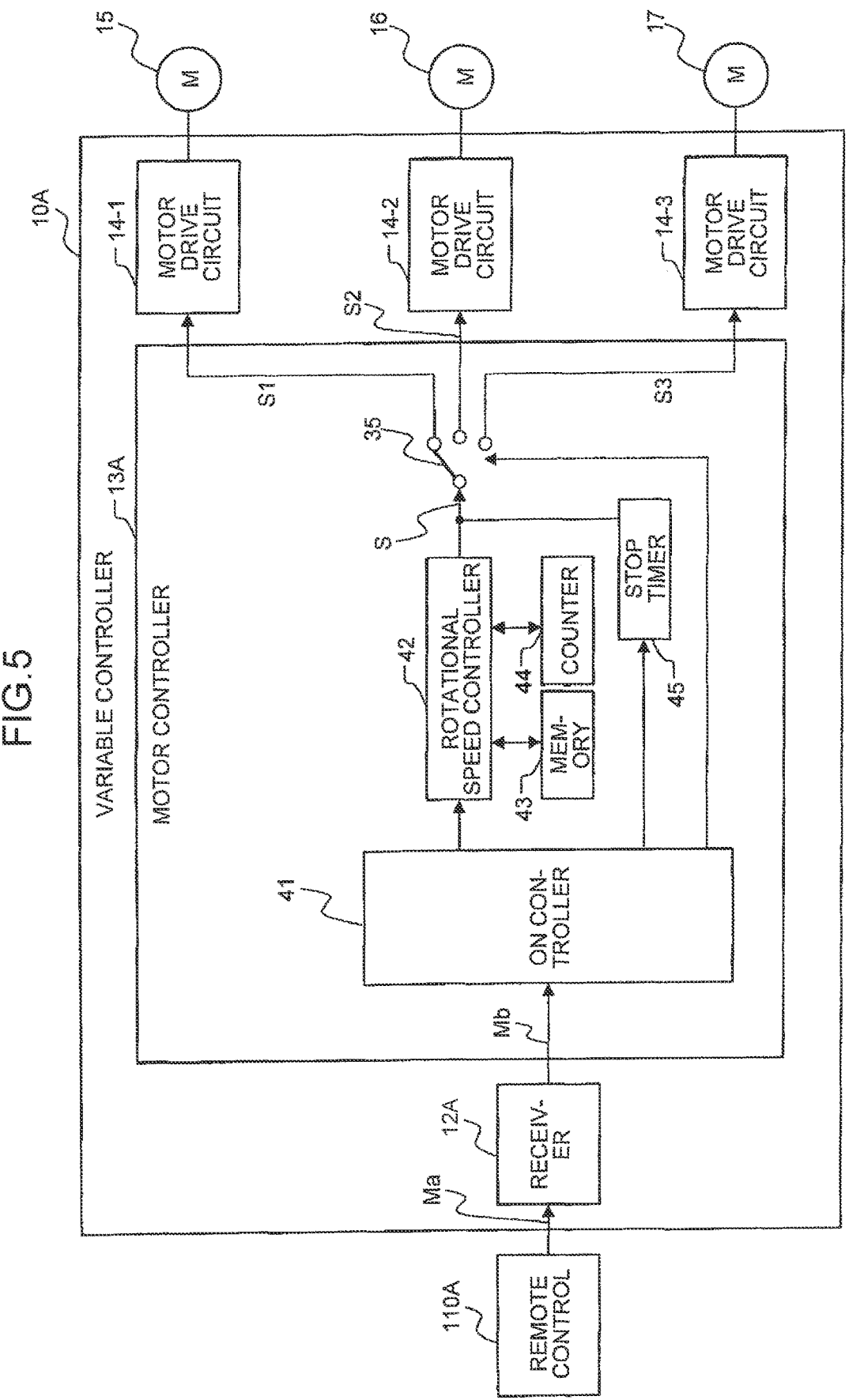
FIG. 5 is a block diagram illustrating an outline of a variable controller in a second embodiment of the present disclosure.

FIG. 5 is a block diagram illustrating an outline of a variable controller 10A in the second embodiment.

The remote control 110A of the second embodiment communicate via infrared radiation, and repeatedly outputs, at a predetermined period, only ON signals (pulse signal) as the communication signal Ma while the direction adjustment push button 111 (refer to FIG. 2) is pressed. Unlike the corresponding component of the first embodiment, the remote control 110A of the second embodiment outputs no OFF signal when the direction adjustment push button 111 is released.

The variable controller 10A of the second embodiment includes a motor controller 13A and a receiver 12A that are different from the corresponding components of the first embodiment, but, except in this point, has the same configuration as that of the first embodiment.

The received signal Mb of the second embodiment continuously rotates the motor, as successive pulses of the pulse signal of a predetermined period, and stops the motor by stopping the pulse signal.

The receiver 12A of the second embodiment successively outputs the pulses of the pulse signal at a predetermined period as the received signal Mb, or stops outputting the pulse signal. The receiver 12A extracts the ON signals, the direction information (pan, tilt, and focus), and the direction of rotation of the motor from the communication signal Ma, and then outputs these signals to the motor controller 13A.

The motor controller 13A of the second embodiment includes an ON controller 41, a rotational speed controller 42, a memory 43, a counter 44, and a stop timer 45, differently from the first embodiment, and further includes the selection switch 35. The motor controller 13A increases the command signal S stepwise at a frequency obtained by dividing the frequency of the pulse signal by N (N is a natural number) from when the pulses of the pulse signal start to be successively received until the command signal S reaches the predetermined value, and thereafter, maintains the value of the command signal S. Moreover, when the pulse signal stops being output, the motor controller 13A sets the command signal S to zero to stop the motor.

The ON controller 41 determines whether the received signal Mb (pulse signal) is input.

Every time the received signal Mb (pulse signal) is input, the stop timer 45 measures time starting from input of the received signal Mb (pulse signal), and, when the time exceeds a time period set in advance, the stop timer 45 stops the motor.

The counter 44 stores an input count n that is a number of times by which the pulses of the received signal Mb (pulse signal) are input.

The rotational speed controller 42 increases the command signal S stepwise every time the input count counted by the counter 44 reaches a predetermined number of times starting from input of the received signal Mb (pulse signal) until the command signal S reaches the predetermined value.

The memory 43 stores, for example, a predetermined value that is the maximum value up to which the command signal S is increased and the predetermined amount.

FIGS. 6A and 6B are timing diagrams each illustrating the variable control operation in the second embodiment.

FIG. 6A is an example of the timing diagram illustrating the variable control operation. The vertical axes of the rows of the timing diagram represent the communication signal Ma, the received signal Mb, the command signal S, and the moving amount D of the motor. The horizontal axes represent time common to the rows.

Immediately before time ts, the operator presses the direction adjustment push button 111 of the remote control 110A. This operation causes the communication signal Ma including the ON signal to be sent from the remote control 110A, and the sending ends at time ts.

At time ts, the received signal Mb that is the pulse signal of the predetermined period is input to the ON controller 41. This start of input of the ON signals at the predetermined period serves as the command to start operating the variable mechanism. The ON controller 41 of the motor controller 13A issues the drive start command to the rotational speed controller 42. The rotational speed controller 42 outputs the command signal S at the level of is corresponding to the initial rotational speed of the motor to the motor drive circuit 14, and commands the stop timer 45 to start measuring time. The command signal S at the level of is causes the moving amount D of the motor to linearly increase corresponding to the elapsed time from time ts. At this time, the moving amount D increases at 1 L per predetermined time period P.

At time t1, the rotational speed controller 42 receives the input count n of the pulses of the pulse signal from the counter 44, and determines that the input count n of the pulses of the pulse signal has reached the predetermined number of times (three times). The rotational speed controller 42 sets the command signal S to the level of 2s, outputs the command signal S to the motor drive circuit 14, and sets the input count n of the pulses of the pulse signal to zero. The command signal S at the level of 2s causes the moving amount D of the motor to linearly increase corresponding to the elapsed time from time t1. At this time, the moving amount D increases at 2 L per predetermined time period P.

In this way, the rotational speed controller 42 increases the level of the command signal S by the predetermined amount of is every time the input count n of the pulses of the pulse signal reaches three until the level of the command signal S reaches the predetermined value of 4s corresponding to the predetermined rotational speed of the motor. The command signal S causes the moving amount D of the motor per predetermined time period P based on the input count n of the pulses of the pulse signal to linearly increase corresponding to the elapsed time.

When the pulse signal is input, the stop timer 45 resets the measuring, and restarts measuring time. When the pulse signal has stopped being received, and the time measured by the stop timer 45 has exceeded a predetermined period of time set in advance, the stop timer 45 outputs the command signal S at a level of zero corresponding to the stop to the motor drive circuit 14 to stop the motor. In the example of FIG. 6A, the stop timer 45 stops the motor at time toff at which the time measured from time t5a exceeds the predetermined period of time.

When the operator intends to finely adjust the moving amount D of the variable mechanism, the operator presses and releases the direction adjustment push button 111 of the remote control 110A in a short time. For example, a case is considered in which the operator presses the direction adjustment push button 111 at time ts, and then releases the direction adjustment push button 111 at time t0 to stop outputting the pulse signal at that time. In this case, the stop timer 45 stops the motor at time t1, and the moving amount D reaches 1 L. Moreover, the operator can increase the moving amount D to 2 L by successively repeating twice the operation of pressing and releasing the direction adjustment push button 111 in the same timing.

When the operator intends to coarsely adjust the moving amount D of the variable mechanism, the operator continues to press the direction adjustment push button 111 of the remote control 110A for a sufficiently long period of time. For example, a case is considered in which the operator presses the direction adjustment push button 111 of the remote control 110A at time ts, and then releases the direction adjustment push button 111 at time t5a to stop outputting the pulse signal. The stop timer 45 stops the motor at time toff, and the moving amount D reaches nLb. During the period from time t3 to time toff, the motor is driven at the predetermined rotational speed. As a result, the moving amount D of the motor can be quickly increased to nLb.

In this way, the increment of the moving amount D of the motor per predetermined time period P increases with the elapsed time, so that the moving amount D of the motor can be finely controlled by using the changing period of the increment from time ts to time t3. From time t3 on, the motor is driven by the command signal S at the level of 4s, so that the moving amount D of the motor can be quickly increased at the predetermined rotational speed. That is, the moving amount D of the motor can be finely adjusted, and also the motor can be quickly moved to a target position, without an addition of a push button for shifting into the fine adjustment mode to the remote control 110A.

FIG. 6B is another example of the timing diagram illustrating the variable control operation. The vertical axes of the rows of the timing diagram represent the communication signal Ma, the received signal Mb, the command signal S, and the moving amount D of the motor. The horizontal axes represent time common to the rows.

In this example, the level of the command signal S increases stepwise every time the input count of the pulses of the pulse signal reaches four. Increasing the input count n of the pulses of the pulse signal can increase the predetermined time period P to, for example, a predetermined time period Pa. The predetermined time period Pa is a period for a frequency obtained by quartering the frequency of the pulse signal. The predetermined time period P can easily be adjusted by increasing or reducing the frequency division value N.

FIG. 7 is a flowchart illustrating a variable control process in the second embodiment.

This variable control process is started, for example, at a predetermined period.

At Step S301, the ON controller 41 determines whether the pulse signal of the received signal Mb is input, that is, whether the ON signals are received. If the ON signals are determined to be received (Yes), the ON controller 41 performs processing at Step S302, or if the ON signals are not determined to be received (No), the ON controller 41 performs processing at Step S304.

At Step S302, the ON controller 41 sets the value of the stop timer 45 to a predetermined count number, and starts the stop timer 45 to count time.

At Step S303, the ON controller 41 adds one to the count number of the counter 44. In the flowchart of FIG. 7, a variable n represents the count number of the counter 44.

At Step S304, the ON controller 41 determines whether the value of the stop timer 45 has reached the predetermined value. If the value of the stop timer 45 has reached the predetermined value (Yes), the ON controller 41 performs processing at Step S309, or if the value of the stop timer 45 has not reached the predetermined value (No), the ON controller 41 performs processing at Step S305.

At Step S305, the rotational speed controller 42 outputs the command signal S, and determines whether the command signal S is less than the predetermined value. The command signal S at the predetermined value is for rotating the motor at the predetermined rotational speed. If the command signal S is determined to be less than the predetermined value (Yes), the rotational speed controller 42 performs processing at Step S306, or if the command signal S is determined to be the predetermined value or greater (No), the process of FIG. 7 ends.

At Step S306, the rotational speed controller 42 determines whether the count number of the counter 44 is the predetermined value or greater. The count number of the counter 44 reaches the predetermined value when the elapsed time from the start of the counting reaches the predetermined time period P. If the count number of the counter 44 is determined to be the predetermined value or greater (Yes), the rotational speed controller 42 performs processing at Step S307, or if the count number of the counter 44 is determined to be less than the predetermined value (No), the process of FIG. 7 ends. In this way, the motor controller 13A can divide the frequency of the pulse signal by the predetermined value. The predetermined value is a natural number.

At Step S307, the rotational speed controller 42 increases the level of the command signal S by the predetermined amount. This operation can accelerate the rotational speed of the motor by an amount corresponding to the predetermined amount.

At Step S308, the rotational speed controller 42 sets the count number of the counter 44 to zero, and the process of FIG. 7 ends.

At Step S309, the ON controller 41 sets the command signal S to zero to stop the motor.

At Step S310, the ON controller 41 sets the count number of the counter 44 to zero, and the process of FIG. 7 ends.

Processing in this way increases the rotational speed of the motor stepwise until the rotational speed reaches the predetermined rotational speed. The operator can finely adjust the moving amount D of the motor by pressing only for a short time, and then releasing, the direction adjustment push button 111. Processing in this way allows the variable controller 10A to finely adjust the variable mechanism corresponding to the limit value of the time interval at which the operator presses the direction adjustment push button 111.

Moreover, after reaching the predetermined rotational speed, the rotational speed of the motor remains at the predetermined rotational speed. The operator can quickly change the lighting direction or the focal length to the target direction or length by keeping on pressing the direction adjustment push button 111.

The variable controller 10A of the present embodiment stops the motor when the ON signal of the communication signal Ma is discontinued, so that the motor does nothing more than stop for an instant even when the ON signal is failed to be received. As a result, the lighting direction and the focal length can be prevented from shifting toward an unintended direction (position).

Modifications

The present disclosure is not limited to the above-described embodiments, but can be carried out by being modified within a range not departing from the gist of the present disclosure, for example, as described in the following items (a) to (n).

(a) The above-described embodiments set the command signal S to zero to stop the motor. The present disclosure is, however, not limited to this configuration. The motor controller may stop the motor by outputting another signal for commanding to turn the motor off to the motor drive circuit.

(b.) The above-described embodiments set the command signal S negative to reverse the rotation of the motor. The present disclosure is, however, not limited to this configuration. The motor controller may reverse the rotation of the motor by outputting another signal for commanding the direction of rotation of the motor to the motor drive circuit.

(c) In the above-described embodiments, each of the receivers 12 and 12A receives the communication signal Ma output from the remote control 110, decodes the communication signal Ma, and outputs the received signal Mb. The present disclosure is, however, not limited to this configuration. The received communication signal Ma may be output to the motor controllers 13 and 13A as the received signal Mb, without being decoded.

(d) The motor to be controlled is not limited, and may be any type of motor.

(e) Each of the motors 15 to 17 may be configured to be directly driven at a rotational speed corresponding to the command signal S. The motor drive circuits 14-1 to 14-3 are not essential components of the present disclosure.

(f) The lighting control device only needs to include at least one motor. The selection switch 35 is not an essential component of the present disclosure.

(g) The command signal S is a signal for commanding the rotational speed of the motor, but may be a signal for commanding the torque of the motor. The position can also be both finely adjusted and quickly adjusted by performing the control so as to increase a torque command signal stepwise until the torque of the motor reaches a predetermined value, and so as not to change the torque command signal thereafter.

(h) The remote control 110 for the lighting control device may be equipped with a joystick that can simultaneously control up-down and right-left movements, and the motors may be simultaneously and independently controlled. This configuration allows the lighting direction of the lighting instrument 120 to be finely adjusted in position in the panning direction while being quickly adjusted in position in the tilting direction.

(i) The structure of the variable lighting device is not limited to the structure illustrated in FIG. 2. For example, no limitation is placed on the shapes and the way of combination of the right/left rotating part 21, the arm 22, and the hood 23 of the variable lighting device 20, or on the position of the motors embedded therein. The variable lighting device 20 only needs to be configured to be capable of at least one of panning and tilting of the lighting direction and focusing.

(j) The remote controller is not limited to the remote control 110 illustrated in the above-described embodiments. For example, the configuration may be such that an electronic device, such as a personal digital assistant or a mobile phone, having the remote control function of the present disclosure is used to perform the control.

(k) The predetermined rotational speeds of the motors used in the present disclosure need not be set to the same value for all the motors to be used, but can be individually set for the respective motors.

(l) In the above-described embodiments, the predetermined time periods P and Pa related to the increase in the moving amount of the motor have been described as constant values. The predetermined time periods need not, however, be constant, but may be variable step-by-step.

(m) In the second embodiment, the motor controller 13A increases the command signal S stepwise at a frequency obtained by dividing the frequency of the pulse signal by N (N is a natural number) from when the pulses of the pulse signal start to be successively received until the command signal S reaches the predetermined value. The present disclosure is, however, not limited to this configuration. The command signal may be increased stepwise at intervals of a predetermined time period set in advance, in the same way as in the first embodiment.

(n) In the above-described embodiments, the value by which the command signal S increases stepwise has been described as the same at any step. The value by which the command signal S increases is, however, not limited to this, but may be changed step-by-step (for example, increased step-by-step, or reduced step-by-step).

What is claimed is:

1. An instrument control device comprising:
   a variable mechanism including a motor configured to adjust a state of an instrument; and
   a variable controller configured to drive the motor at a rotational speed corresponding to a command signal, the variable controller comprising:
      a receiver configured to receive a wireless communication signal output at a predetermined period from a remote controller and output a pulse signal when an adjustment push button of the remote controller is pushed; and
      a motor controller configured to increase the command signal stepwise for each time the pulse signal is inputted N times (N is a natural number), starting from input of the pulses of the pulse signal until the command signal reaches a predetermined value and thereafter maintains the command signal at the predetermined level, and sets the command signal to zero to stop the motor at a time the input of the pulse signal is stopped;
   wherein the time that the pulse signal is inputted N times is set to a limit value at which an operator operates the adjustment push button.

2. The instrument control device according to claim 1, wherein the motor controller sets the command signal so as to measure elapsed time starting from input of the pulse signal every time each pulse of the pulse signal is input, and stop the motor at a time the elapsed time exceeds a predetermined value period set in advance.

3. The instrument control device according to claim 2, wherein the motor controller comprises:
   an ON controller configured to determine whether the pulse signal is input;
   a stop timer configured to set the command signal so as to measure elapsed time starting from input of the pulse signal every time each pulse of the pulse signal is input, and stop the motor at a time the elapsed time exceeds a predetermined time period set in advance;
   a counter configured to count an input count of the pulses of the pulse signal, and set the input count to zero at a time the input count reaches a predetermined number of times; and
   a rotational speed controller configured to increase the command signal stepwise every time the input count counted by the counter reaches the predetermined number of times starting from the input of the pulse signal until the command signal reaches the predetermined value.

* * * * *